United States Patent [19]

Yoshiyuki

[11] 4,424,996

[45] Jan. 10, 1984

[54] COMBINATION BUMPER-AND-RADIATOR STRUCTURE

[75] Inventor: Kazuhiko Yoshiyuki, Yokohama, Japan

[73] Assignee: Nissan Motor Company, Limited, Kanagawa, Japan

[21] Appl. No.: 328,705

[22] Filed: Dec. 8, 1981

[30] Foreign Application Priority Data

Dec. 26, 1980 [JP] Japan .............................. 55-186378

[51] Int. Cl.³ ............................................. B60R 19/10
[52] U.S. Cl. ................................. 293/117; 180/54 A
[58] Field of Search ............ 180/54 A; 293/117, 109, 293/110, 132

[56] References Cited

U.S. PATENT DOCUMENTS

| | | | |
|---|---|---|---|
| 2,260,578 | 1/1940 | Murray | 293/117 |
| 2,866,510 | 12/1958 | Flamm | 293/117 |
| 3,708,194 | 1/1973 | Amit | 293/117 |
| 4,029,350 | 6/1977 | Goupy et al. | 293/117 |
| 4,149,733 | 4/1979 | Grooss | 293/117 |

FOREIGN PATENT DOCUMENTS 7628257  9/1976  France .............................. 293/117

*Primary Examiner*—Richard A. Bertsch

[57] ABSTRACT

Herein disclosed is a combination bumper-and-radiator structure for attachment to the front end of an automotive vehicle having a fore-and-aft direction, comprising: a front bumper having a horizontally elongated base wall portion, and upper and lower wall portions elongated along and rearwardly of the base wall portion, the base wall portion being formed with at least one air inlet opening, and a radiator grille positioned between the upper and lower wall portions of the front bumper and partially exposed to the open air through the air inlet opening.

1 Claim, 5 Drawing Figures

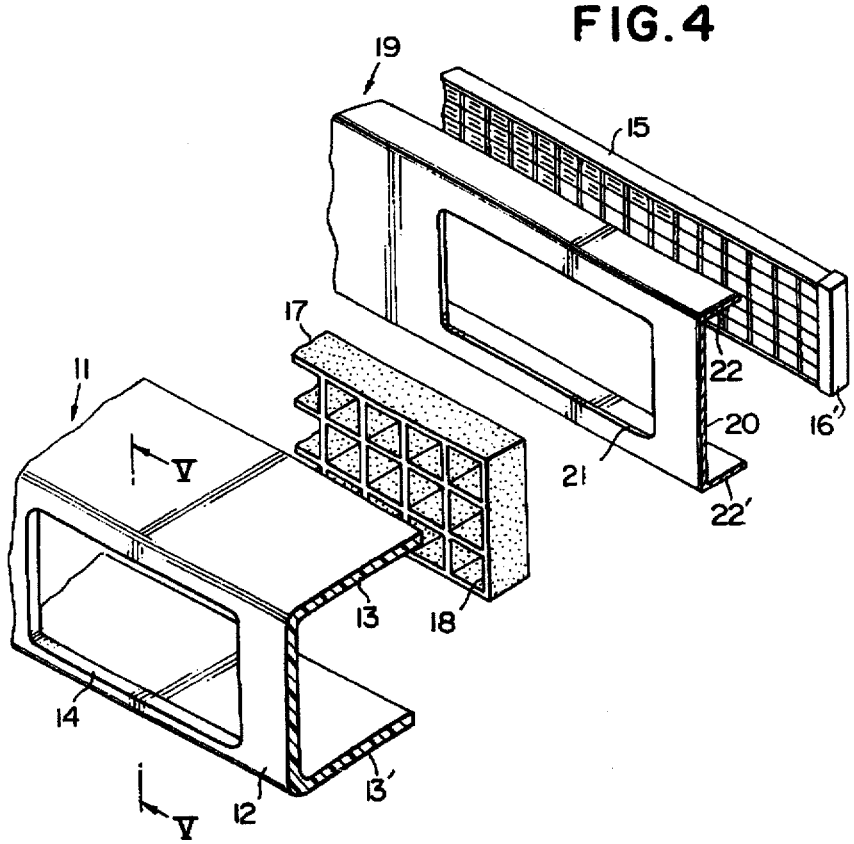

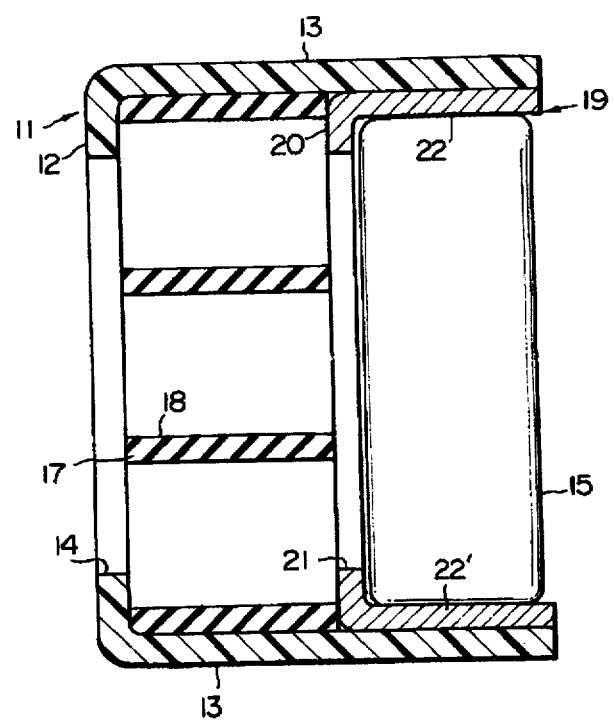

COMBINATION BUMPER-AND-RADIATOR STRUCTURE

FIELD OF THE INVENTION

The present invention relates to a combination bumper-and-radiator structure to be attached to the front end of an automotive vehicle and, more particularly, to an arrangement of a radiator grille which is designed to be integrally housed in a front bumper of an automotive vehicle.

SUMMARY OF THE INVENTION

In accordance with the present invention, there is provided a combination bumper-and-radiator structure for attachment to the front end of an automotive vehicle having a fore-and-aft direction, comprising: a front bumper having a horizontally elongated base wall portion, and upper and lower wall portions elongated along and rearwardly of the base wall portion, the base wall portion being formed with at least one air inlet opening, and a radiator grille positioned between the upper and lower wall portions of the front bumper and partially exposed to the open air through the air inlet opening. The combination bumper-and-radiator structure may further comprise a resilient honeycomb member horizontally elongated and interposed between the base wall portion of the front bumper and the radiator grille for absorbing the energy of a collision exerted on the base wall portion of the front bumper. The resilient honeycomb member may be formed with a multiplicity of holes each having a front end open to the air inlet opening and a rear end open to the radiator grille and may be constructed of cellular foams of urethane. The combination bumper-and-radiator structure may further comprise a bumper reinforcement member having a horizontally elongated base wall portion formed with an opening substantially identical in measurements to the air inlet opening, and upper and lower wall portions elongated along and rearwardly of the base wall portion, the bumper reinforcement member being interposed between the resilient honeycomb member and the radiator grille, the opening in the base wall portion of the reinforcement member being substantially in registry with the air inlet opening in the base wall portion of the front bumper in the fore-and-aft direction of the automotive vehicle, and the outer surfaces of the upper and lower wall portions of the bumper reinforcement member being held in contact with the inner surfaces of the upper and lower wall portions of the front bumper.

BRIEF DESCRIPTION OF THE DRAWINGS

Drawbacks of a prior-art arrangement of a front bumper and a radiator grille and the features of a combination bumper-and-radiator structure proposed by the present invention as being advantageous over the prior art arrangement will be clearly understood from the following description taken in conjunction with the accompanying drawings, in which:

FIG. 4 is a fragmentary exploded perspective view of another embodiment of the combination bumper-and-radiator structure according to the present invention, and FIG. 5 is an enlarged cross sectional view taken on line V—V of FIG. 4.

DESCRIPTION OF THE PRIOR ART

Figure 1:
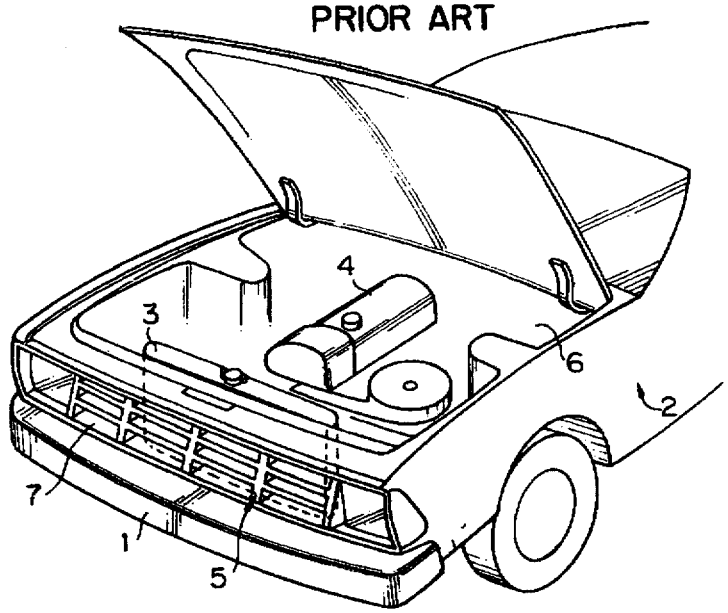
FIG. 1 is a fragmentary perspective view of an automotive vehicle having a hood opened and showing an engine room and a prior-art arrangement of a front bumper and a radiator grille.
Figure 2:
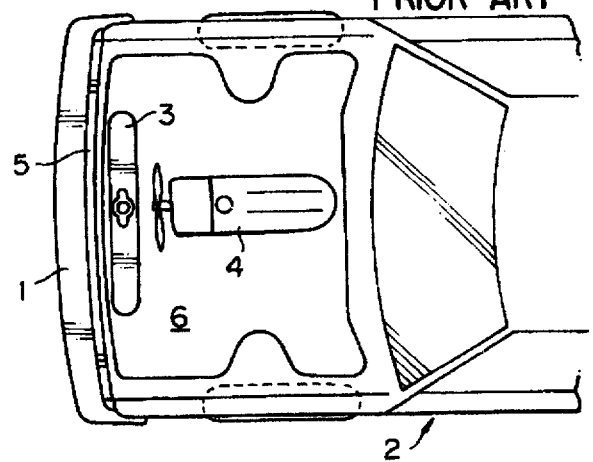
FIG. 2 is a fragmentary plan view of the automotive vehicle illustrated in FIG. 1 and also having the hood opened.

A typical example of an automotive vehicle is shown in FIGS. 1 and 2 as comprising a front bumper 1 attached to the front end of an automotive vehicle 2 for protecting the vehicle 2 upon collision against other objects. The vehicle further comprises a radiator grille 3 positioned between an engine 4 and a front grille 5 in an engine room 6 so as to allow air to be inhaled through an air intake openings 7 formed in the front grille 5. As will be seen from FIGS. 1 and 2, the radiator grille 3 is located separately from the front bumper 1 and thus requires a sufficiently large space in the engine room 6 which is determined by an engine capacity including the engine 4, the radiator grille 3 and their accessaries. This follows that such a large space not only restricts the measurements of a passenger compartment of the automotive vehicle but constrains the measurements of an overall vehicle body.

BRIEF DESCRIPTION OF THE OBJECT

It is therefore an object of the present invention to provide a combination bumper-and-radiator structure which has the radiator grille removed from the engine room and assembled in the front bumper without deteriorating functions of the front bumper and the radiator grille per se for the purpose of reducing the space of the engine room.

DESCRIPTION OF THE EMBODIMENTS

Figure 3:
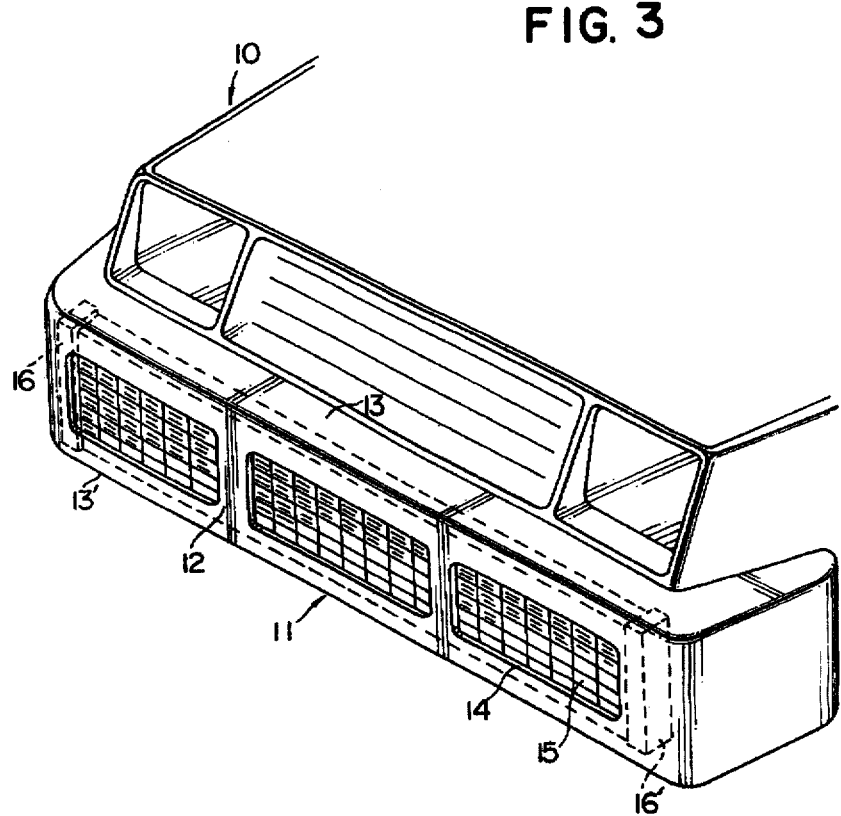
FIG. 3 is a perspective view of one embodiment of a combination bumper-and-radiator structure according to the present invention and showing the structure attached to the front end of the automotive vehicle.

Referring to FIG. 3 of the drawings, a combination bumper-and-radiator structure according to the present invention is shown as being attached to the front end of an automotive vehicle 10 having a fore-and-aft direction. The structure comprises a front bumper 11 having a cross section configured generally in a channel shape and constructed of a suitable metal. The front bumper 11 has a horizontal elongated base wall portion 12, and upper and lower wall portions 13 and 13' elongated along and rearwardly of the base wall portion 12. The base wall portion 12 and the upper and lower wall portions 13 and 13' have respective lateral end portions bent rearwardly. The base wall portion 12 has a height higher than that of the prior art front bumper 1 and is formed with a plurality of air inlet openings 14 each having a generally rectangular configuration elongated horizontally as will be seen in FIG. 3. A radiator grille 15 has a laterally elongated configuration and is positioned between the upper and lower wall portions 13 and 13' and partially exposed to the open air through the air inlet openings 14. The radiator grille 15 has a thickness to the extent that the radiator grille 15 by no means partially projects rearwardly from the rear ends of the upper and lower wall portions 13 and 13' of the front bumper 11. The radiator grille 15 is thus snugly received in a grille recess defined by the base wall portion 12 and the upper and lower wall portions 13 and 13' of the front bumper 11. The radiator grille 15 has a number of cooling fins (not shown) which allow heat to be be radiated therethrough. Through the radiator grille 15 is circulated cooling water which is accumulated in reservoir tanks 16 and 16' securely connected to opposite ends of the radiator grille 15. The radiator grille 15 is secured to brackets, formed on the base wall portion 12 and the upper and/or lower wall portions 13 and 13' by suitable fastening means such as bolts and nuts.

The combination bumper-and-radiator structure thus constructed is arranged in front of the automotive vehicle 10 as in a usual manner of the prior art front bumper 1. In this instance, the vehicle body of the automotive vehicle 10 is formed with a plurality of openings (not shown) in registry with the air inlet openings 14 and open to the engine room so that the radiator grille 15 can effectively be cooled by air passing through the air inlet openings 14 and the openings of the vehicle body.

In FIGS. 4 and 5 of the drawings, another embodiment of the combination bumper-and-radiator structure embodying the present invention is shown further comprising a resilient honeycomb member 17 which is horizontally elongated and interposed between the base wall portion 12 of the front bumper 11 and the radiator grille 15 so as to absorb the energy of a collision exerted on the base wall portion 12 of the front bumper 11. The honeycomb member 17 is formed with a multiplicity of holes 18 each having a front end open to the air inlet openings 14 and a rear end open to the radiator grille 15 and thus allowing air to pass therethrough. The honeycomb member 17 is constructed of cellular foams of urethane or any other elastic material and is thus more effective as collision energy absorbing means. The radiator grille 15 is accordingly effectively protected by the honeycomb member 17 upon collision of the front bumper 11 against obstacles even if the front bumper 11 is constructed of a synthetic resin.

In order to reinforce the front bumper 11 and to prevent the resilient honeycomb member 17 from being deformed, the combination bumper-and-radiator structure according to the present invention further comprises a bumper reinforcement member 19 which is also generally in a channel shape in cross section. The bumper reinforcing member 19 has a horizontally elongated base wall portion 20 formed with a plurality of openings 21 each substantially identical in measurements to each of the air inlet openings 14, and upper and lower wall portions 22 and 22' elongated along and rearwardly of the base wall portion 20. The bumper reinforcement member 19 is interposed between the resilient honeycomb member 17 and the radiator grille 15 with the openings 21 in the base wall portion 20 of the bumper reinforcement member 19 being respectively substantially in registry with the air inlet openings 14 in the base wall portion 12 of the front bumper 11 in the fore-and-aft direction of the automotive vehicle 10, and with the outer surfaces of said upper and lower wall portions 22 and 22' of bumper reinforcement member 19 being held in contact with the inner surfaces of the upper and lower wall portions 12 and 12' of the front bumper 11. The bumper reinforcing member 19 may be bonded to the resilient honeycomb member 17 by means of a suitable adhesive material and may be clamped by the upper and lower wall portions 13 and 13' of the front bumper 11. In the present embodiment, the radiator grille 15 is secured to the bumper reinforcing member 19 as described in the manner of the previously mentioned embodiment with reference to FIG. 3.

The latter embodiment of the combination bumper-and-radiator structure according to the present invention is capable of passing air through the air inlet openings 14 of the front bumper 11, the holes 18 of the resilient honeycomb member 17 and the openings 21 of the bumper reinforcing member 19 so that the radiator grille 15 can be effectively cooled by the air.

While it has been described that a plurality of air inlet openings 14 are formed in the base wall portion 12 of the front bumper 11, at least one air inlet opening may be formed in the base wall portion 12 of the front bumper 11 according to the present invention. In this case, at least one opening is required to be formed in the base wall portion 20 of the bumper reinforcing member 19 so as to be in registry with the air intake opening in the base wall portion 12 of the front bumper 11. The combination bumper-and-radiator may be attached to the front end of the automotive vehicle 10 after the radiator grille 15 is coupled to the front bumper 11. Or otherwise, the front bumper 11 may be coupled to the radiator grille 15 after the radiator grille 15 is attached to the front end of the vehicle 10 as the case may be according to the present invention. The combination bumper-and-radiator structure may be mounted on any automotive land vehicles including a passenger car, a bus, a truck and the like.

What is claimed is:

1. A combination bumper-and-radiator structure for attachment to the front end of an automotive vehicle having a fore-and-aft direction, comprising:

a front bumper having a horizontally elongated base wall portion, and upper and lower wall portions elongated along and rearwardly of the base wall portion, the base wall portion being formed with at least one air inlet opening;

a radiator grille positioned between said upper and lower wall portions of said front bumper and partially exposed to the open air through said air inlet opening;

a resilient honeycomb member horizontally elongated and interposed between the base wall portion of said front bumper and said radiator grille for absorbing the energy of a collision exerted on the base wall portion of said front bumper; and a bumper reinforcement member having a horizontally elongated base wall portion formed with an opening held in communication with said air inlet opening through said resilient honeycomb member, and upper and lower wall portions elongated along and rearwardly of the base wall portion, the bumper reinforcement member being interposed between said resilient honeycomb member and said radiator grille.

* * * * *